United States Patent
Fukuda et al.

(10) Patent No.: US 6,657,827 B1
(45) Date of Patent: Dec. 2, 2003

(54) HEAD

(75) Inventors: Mitsumasa Fukuda, Okayama-ken (JP); Yukio Sakamoto, Moriyama (JP); Jun Kojima, Yokaichi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/669,036

(22) Filed: Sep. 25, 2000

(30) Foreign Application Priority Data

Sep. 24, 1999 (JP) .......................................... 11-271024

(51) Int. Cl.$^7$ ................................................ G11B 5/39
(52) U.S. Cl. ...................................................... 360/323
(58) Field of Search ................................. 360/319, 323, 360/320, 321, 322, 241.1

(56) References Cited

U.S. PATENT DOCUMENTS

| | | | | |
|---|---|---|---|---|
| 5,351,158 A | * | 9/1994 | Shibata | 360/322 |
| 5,532,656 A | * | 7/1996 | Yoshimura | 333/185 |
| 5,792,546 A | * | 8/1998 | Kanamine et al. | 428/212 |
| 5,805,390 A | * | 9/1998 | Takeura | 360/113 |
| 5,812,349 A | * | 9/1998 | Shouji et al. | 360/110 |
| 5,978,181 A | * | 11/1999 | Niijima et al. | 360/323 |
| 6,031,280 A | * | 2/2000 | Sakoda | 257/692 |
| 6,060,967 A | * | 5/2000 | Asada | 333/202 |
| 6,233,127 B1 | * | 5/2001 | Shimazawa | 360/323 |
| 6,267,903 B1 | * | 7/2001 | Watanuki | 216/22 |
| 6,424,505 B1 | * | 7/2002 | Lam et al. | 360/323 |

FOREIGN PATENT DOCUMENTS

| | | |
|---|---|---|
| JP | 4-366409 A | 12/1992 |
| JP | 8-045033 A | 2/1996 |
| JP | 11-238212 A | 8/1999 |
| JP | 11-265503 A | 9/1999 |

* cited by examiner

Primary Examiner—William Klimowicz
Assistant Examiner—Dzung C. Nguyen
(74) Attorney, Agent, or Firm—Keating & Bennett, LLP

(57) ABSTRACT

A head includes a head chip, having first and second external connection electrodes, for reading a signal from a storage medium and writing a signal on the storage medium, a substrate having the head chip mounted thereon, a hot-side conductor path and a ground-side conductor path each formed on the surface of the substrate and electrically connected to the corresponding external connection electrodes of the head chip, and a chip varistor, mounted on the substrate, having first, second, and third terminal electrodes, the third terminal electrode being connected to the ground. In the head, the hot-side conductor path is divided, and the corresponding conductor parts of ends of the divided hot-side conductor paths are electrically connected to the first and the second terminal electrodes, and the ground-side conductor path is electrically connected to the third terminal electrode of the chip varistor.

2 Claims, 6 Drawing Sheets

HEAD

BACKGROUND OF THE INVENTION

1. Field of the Invention

The present invention relates to heads provided with a head chip, such as a magnetoresistive effect (MR) element or a magneto-optical read-write element, and more particularly relates to a head provided with an electrostatic noise-suppression circuit.

2. Description of the Related Art

Various types of heads have been used as a device for reading and writing a signal on a hard disk. For example, an MR head taking advantage of the magnetoresistive effect, a head taking advantage of magneto-optical writing and reading, and the like are known.

FIG. 9 is a perspective view showing one example of these conventional heads. A head 51 includes a head chip 52 having an MR element. The head chip 52 is provided in the proximity of a disk 53 (indicated by imaginary lines), the head reads signals recorded in the disk and writes signals to the disk.

Recently, the signal-reading speed of hard disks has increased. For example, a hard disk having a head 51 whose signal-reading speed is over 100 MB/s has been put into practical use. Furthermore, a hard disk having a signal-reading speed of 200 MB/s or more has appeared.

To deal with the hard disks having such a high signal-reading speed, an MR head chip has been used as the head chip 52 because of its superiority in the response speed.

In the head 51, noise due to electrostatic charge is required to be removed. Conventionally, in order to remove this electrostatic noise, the head chip 52 is connected to a two-terminal varistor.

FIG. 10 illustrates a noise-suppression circuit using the conventional head 51. As shown in FIG. 10, an electrostatic pulse generator 54 generates electrostatic noise and the two-terminal varistor 55 is provided ahead of the head chip 52 to remove the electrostatic noise. $L_4$ represents the inductance of the circuit of the head 51, and $L_1$ represents a series-equivalent inductance of the two-terminal varistor 55.

As the reading speed of the hard disk becomes faster, noise that is generated due to the discharge of electrostatic charges and that has a very short pulse width, whose duration is below a few nano-seconds, adversely-affects the head chip 52, whereby characteristics of the head chip 52 tend to be deteriorated. This means that although the two-terminal varistor 55 is intended to serve to protect the head chip 52 from electrostatic noise, relatively high series-equivalent inductances $L_1$ and $L_4$ delay the operation of the varistor 55, which leads to inadequate removal of the electrostatic noise.

SUMMARY OF THE INVENTION

Accordingly, it is an object of the present invention to provide a head which is capable of positively removing electrostatic noise and whose characteristics are hard to deteriorate when writing and reading, even when a high-speed head chip is used.

To this end, there is provided a head including a head chip, having first and second external connection electrodes, for reading a signal from a storage medium and writing a signal on the storage medium, a substrate having the head chip mounted thereon, a hot-side conductor path and a ground-side conductor path each formed on the surface of the substrate and electrically connected to the corresponding external connection electrodes of the head chip, and a chip varistor, mounted on the substrate, having first, second, and third terminal electrodes, the third terminal electrode being connected to the ground. In the head, the hot-side conductor path is divided, and the corresponding conductor parts of ends of the divided hot-side conductor paths are electrically connected to the first and the second terminal electrodes of the chip varistor, and the ground-side conductor path is electrically connected to the third terminal electrode of the chip varistor.

Since the head according to the present invention uses the three-terminal chip varistor having the first and the second terminal electrodes, and the third terminal electrode, which is grounded, the inductance of the head can be decreased by the equivalent-series inductance of the three-terminal chip varistor compared to a case in which a conventional two-terminal varistor is used. Accordingly, electrostatic noise can be effectively removed. Even in a case in which a high-speed head chip is used, since the electrostatic noise can be effectively removed, deterioration in characteristics of the head can be prevented during writing and reading.

Since the hot-side conductor path is divided and the corresponding conductor parts of ends of the divided hot-side conductor paths are electrically connected to the first and the second terminal electrodes, when electrostatic noise is input from the hot-side conductor path part which is not connected to the head chip, the electrostatic noise is output from the chip varistor to the third terminal electrode connected to the ground. Accordingly, the electrostatic noise can be removed via the ground-side conductor path. That is, the electrostatic noise can be prevented from being input to the hot-side conductor path part which is connected to the head chip. Therefore, deterioration in characteristics of the head due to electrostatic noise can be prevented.

The head may further include a fourth terminal electrode connected to the ground. In the head, the ground-side conductor path is divided, and the corresponding conductor parts of ends of the divided ground-side conductor paths are electrically connected to the third and fourth terminal electrodes.

Since the head according to the present invention uses the four-terminal chip varistor, in the same manner as in the three-terminal chip varistor, the inductance of the head can be decreased by the equivalent-series inductance of the four-terminal chip varistor, whereby electrostatic noise can be effectively removed. When electrostatic noise is input from the hot-side conductor path part which is not connected to the head chip, the electrostatic noise is output to the terminal electrode which is connected not to the head chip but to the ground-side conductor path part. Accordingly, the influence of electrostatic noise on the head chip can be prevented.

DESCRIPTION OF THE PREFERRED EMBODIMENTS

Figure 1:
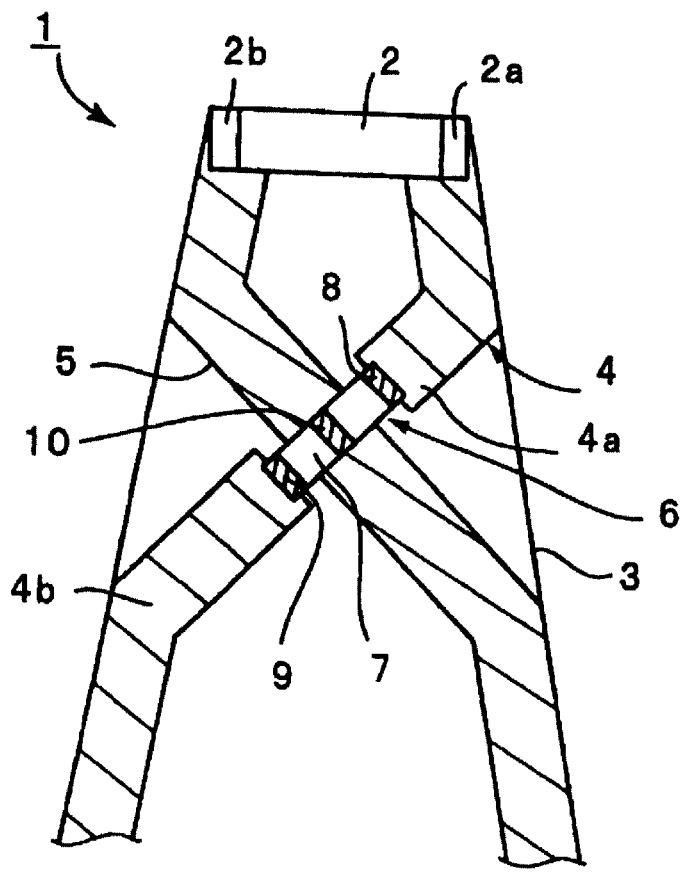
FIG. 1 is a bottom view of a head according to a first embodiment of the present invention.

FIG. 1 shows a bottom view of a head 1 according to a first embodiment of the present invention. The head 1 includes a head chip 2 having an MR element. The head chip 2 includes first and second external connection electrodes 2a and 2b for establishing connection with an external circuit. In this embodiments, though the MR element is used as the head chip 2, another reading-writing element, such as a magneto-optical reading-writing element, can be used.

The head chip 2 is mounted on a substrate 3. A hot-side conductor path 4 and a ground-side conductor path 5 are formed on a surface of the substrate 3 having the head chip 2 mounted thereon. The hot-side conductor path 4 is divided into hot-side conductor path parts 4a and 4b. One end of the hot-side conductor path part 4a is electrically connected to the first external connection electrode 2a of the head chip 2. One end of the ground-side conductor path 5 is electrically connected to the second external connection electrode 2b. In a first embodiment, the hot-side conductor path 4 and the ground-side conductor path 5 are disposed so as to intersect each other at the center of the substrate 3 in which the hot-side conductor path 4 is divided as described above. In other words, the ground-side conductor path 5 passes though the portion in which the hot-side conductor path parts 4a and 4b are divided so as to maintain a predetermined distance.

A three-terminal chip varistor 6 is mounted at the intersection of the hot-side conductor path 4 and the ground-side conductor path 5.

Figure 2:
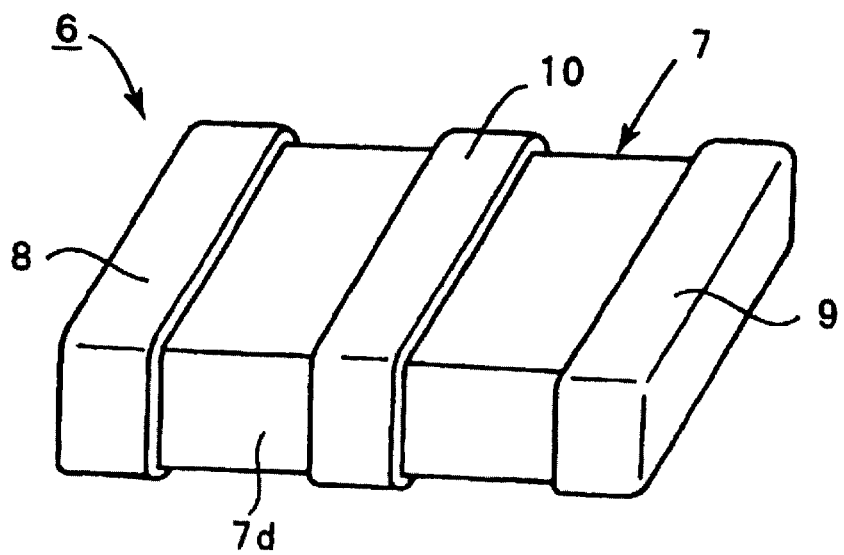
FIG. 2 is a perspective view of a three-terminal chip varistor used in the head shown in FIG. 1.

The chip varistor 6 is described with reference to FIGS. 2 to 4. As shown in a perspective view of FIG. 2, the chip varistor 6 includes a ceramic sintered body 7 having varistor characteristics, and a first terminal electrode 8, a second terminal electrode 9, and a third terminal electrode 10 provided on the surface of the ceramic sintered body 7.

Figure 3A:
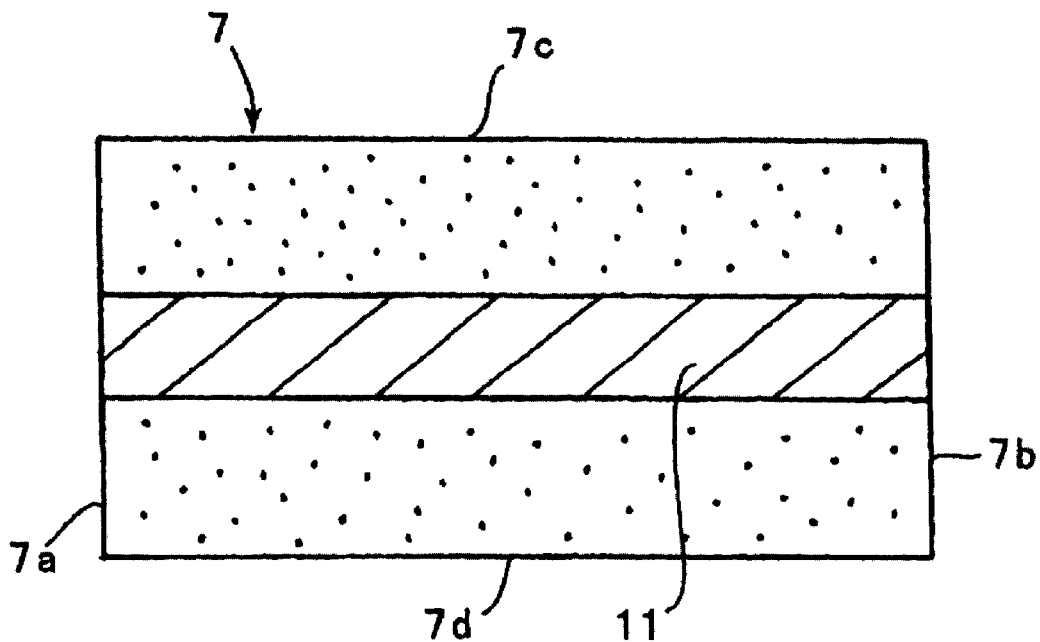
FIGS. 3A and 3B are illustrations each showing an internal electrode of the chip varistor shown in FIG. 2.
Figure 3B:
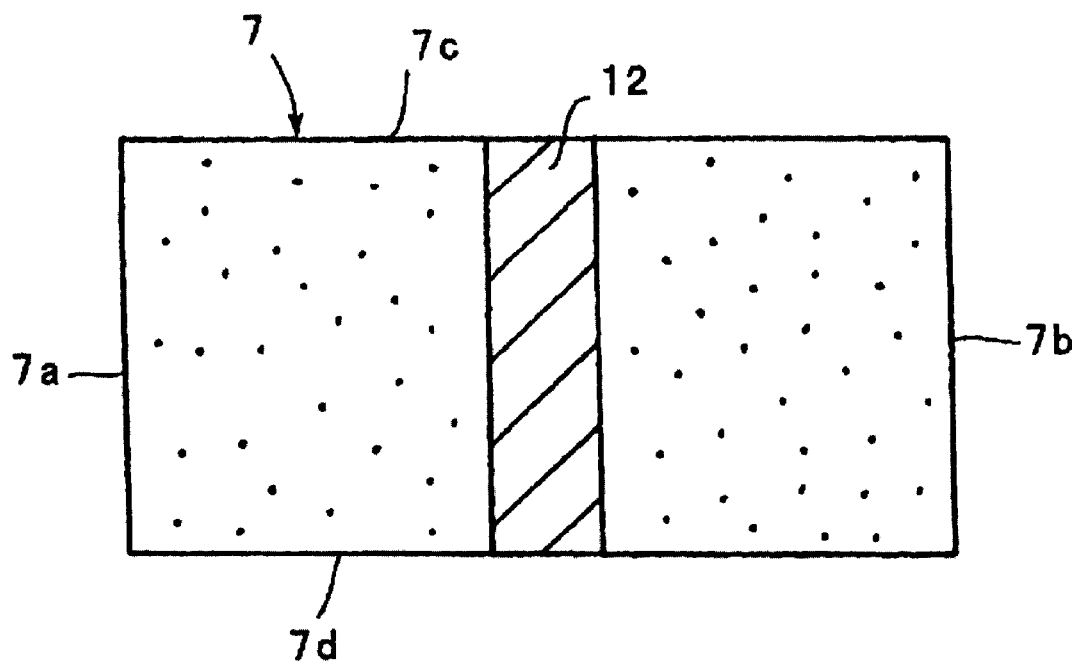

Inside of the ceramic sintered body 7, internal electrodes 11, as shown in a top cross-sectional view of FIG. 3A, and internal electrodes 12, as shown in a top cross-sectional view of FIG. 3B, are alternately laminated via ceramic layers so as to maintain some distance therebetween in the thickness direction.

Figure 4:
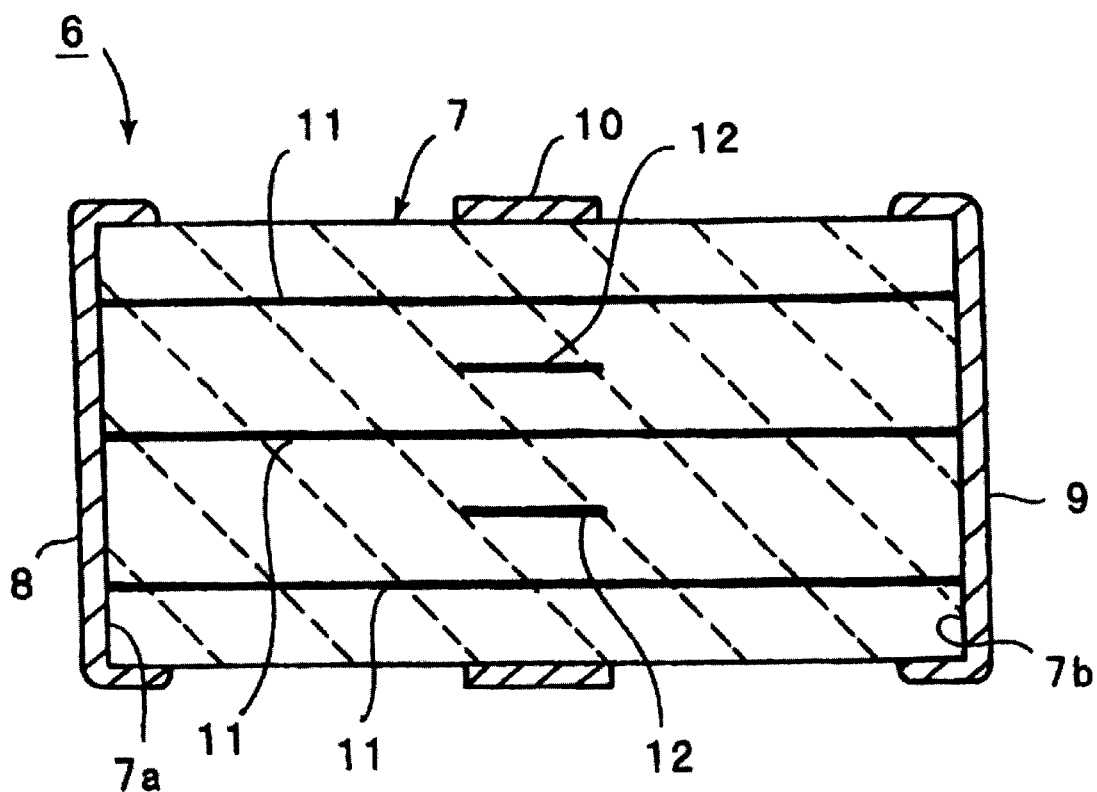
FIG. 4 is a vertical cross sectional view of the chip varistor shown in FIG. 2.

As shown in FIG. 4, the internal electrodes 11 are formed so as to reach ends 7a and 7b of the ceramic sintered body 7, and the internal electrodes 12 are formed extending along the width direction thereof so as to reach ends 7c and 7d thereof.

The first and the second terminal electrodes 8 and 9 are formed so as to cover the ends 7a and 7b, respectively, the ends of the internal electrodes 11 are electrically connected to the corresponding first and second terminal electrodes 8 and 9. The third electrode 10 is formed in the center in the longitudinal direction of the ceramic sintered body 7 so as to wind around the ceramic sintered body 7. The ends of the internal electrodes 12 are electrically connected to the third terminal electrode 10.

The third terminal electrode 10 of the chip varistor 6 is connected to the ground line or ground potential, and the first and the second terminal electrodes 8 and 9 are connected to the signal line, which enables electrostatic noise to be removed.

In the head 1 of the first embodiment, the first and the second terminal electrodes 8 and 9 of the three-terminal chip varistor 6 are electrically connected to the hot-side conductor path parts 4a and 4b, respectively, and the third terminal 10 of the chip varistor 6 is electrically connected to the ground-side conductor path 5.

Electrostatic noise is removed by using the three-terminal chip varistor 6. Even in a case in which the high-speed head chip 2 is used, deterioration of characteristics of the head 1 due to electrostatic noise can be effectively prevented. This is described with reference to FIG. 5.

Figure 5:
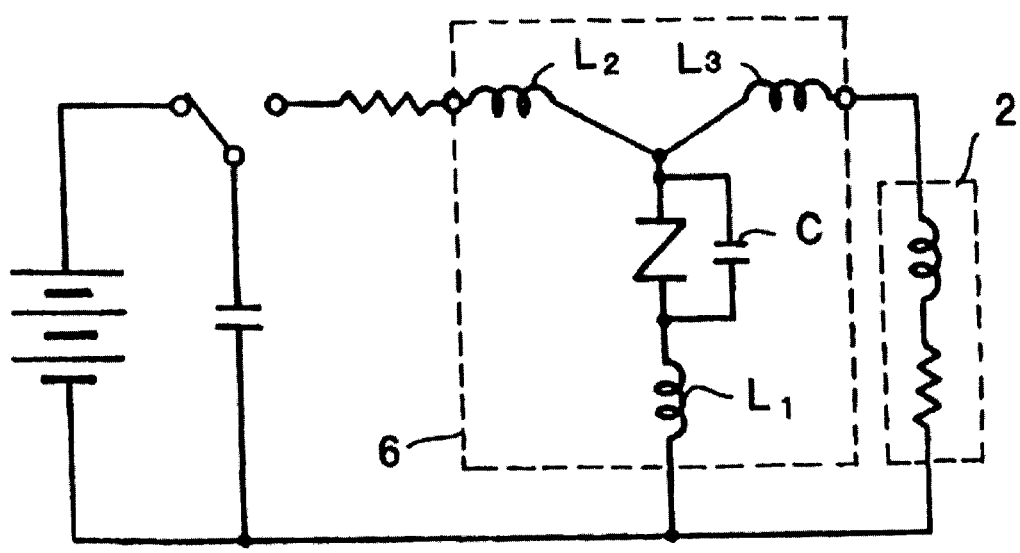
FIG. 5 is the diagram of a circuit for an electrostatic-noise-removal test of the chip varistor shown in FIG. 2.
Figure 10:
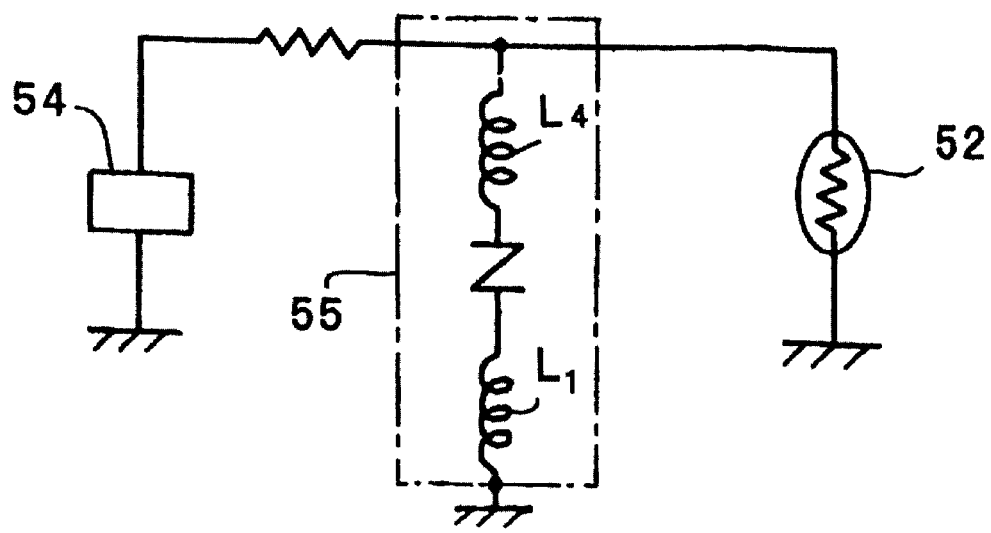
FIG. 10 is the diagram of a circuit for removing electrostatic noise from the conventional head using a two-terminal varistor.

FIG. 5 shows the construction of a circuit for examining the influence of electrostatic noise on the head 1. In FIG. 5, $L_1$ and C represent the equivalent-series inductance and the capacitance of the chip varistor 6. $L_2$ and $L_3$ represent equivalent inductances connected in series with a "hot line". The equivalent inductances $L_2$ and $L_3$ are obtained by converting an equivalent-series inductance $L_4$ which is connected in series with a varistor in FIG. 10, and which is provided on the hot-side. Conventionally, the head 51 uses the two-terminal chip varistor 55 shown in FIG. 10. Since the varistor has the equivalent-series inductances $L_1$ and $L_4$ on the hot-side and the ground-side thereof, which delay the arrival of electrostatic pulses to the varistor 55, electrostatic noise cannot be positively removed.

On the other hand, in the first embodiment, since the head 1 uses the three-terminal chip varistor 6, there is no equivalent-series inductance on the hot-side of the chip varistor 6. This means that the equivalent-series inductance $L_1$ shown in FIG. 5 is smaller than the equivalent-series inductance in a case in which the conventional two-terminal varistor 55 is used. Furthermore, the inductances $L_2$ and $L_3$, which are converted from the inductance $L_4$, serve to delay the arrival of the pulses to the head 1 until the varistor 6 starts to function. Therefore, the head 1 can remove electrostatic noise more effectively and can deal with the high-speed head chip 2.

When electrostatic noise is input from the hot-side conductor path part 4b, the internal electrodes 11 discharge toward the internal electrodes 12, and the electrostatic noise is output to the ground potential via the ground-side conductor path 5. In other words, even when electrostatic noise is input from the hot-side conductor path part 4b, the electrostatic noise is removed at the ground-side conductor path portion opposite to the ground-side conductor path portion where the chip varistor 6 is connected to the head chip 2. Therefore, since the electrostatic noise hardly passes through the hot-side conductor path part 4a, the influence of electrostatic noise on the head chip 2 can be securely removed.

A concrete design example is described. In the circuit shown in FIG. 5, static charge of 2 kV and 1 ns pulse duration is generated. The head chip 2 includes an MR element having a reading speed of 100 to 200 Mb/s and a resistance of 50 Ù. In this case, in order to allow signals to pass through the head chip 2, the most permissible value of the inductance $L_2$ is between 2 nH and 10 nH, and the most permissible value of the capacitance C is between 3 pF and 10 pF.

Under the above conditions, the varistor voltage of the chip varistor 6 and the equivalent-series inductance $L_1$ should be set as shown in Table 1 so that the head chip 2 is protected from electrostatic noise.

TABLE 1

| VARISTOR VOLTAGE (V) | INDUCTANCE OF VARISTOR (nH) | INDUCTANCE OF CIRCUIT (nH) | VOLTAGE ACROSS HEAD CHIP (V) |
|---|---|---|---|
| 5 | 0.2 | 2 | 6.2 |
|  | 2.0 | 2 | 17.0 |
| 10 | 0.2 | 2 | 11.2 |
|  | 2.0 | 2 | 22.0 |

As is obvious from the above design conditions, it is understood that the head chip 2 can be positively protected from the electrostatic noise when the chip varistor 6 is used in which the varistor voltage=5V, the equivalent-series inductance $L_1$=0.2 nH, and the capacitance C=10 pF.

Figure 6:
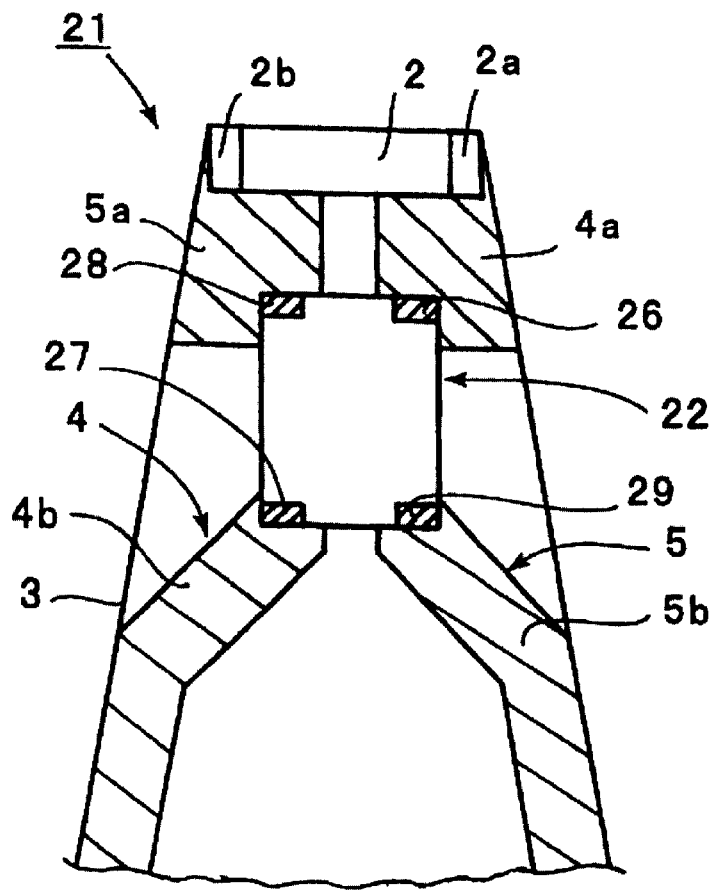
FIG. 6 is a bottom view of a head according to a second embodiment of the present invention.

FIG. 6 shows a bottom view of a head 21 according to a second embodiment of the present invention. In the second embodiment, a four-terminal chip varistor 22 is used in the head 21. A head chip 2 is mounted on a substrate 3, and first and second external connection electrodes 2a and 2b are connected to a hot-side conductor path 4 and a ground-side conductor path 5, respectively. In the second embodiment, since the four-terminal chip varistor 22 is used, the hot-side conductor path 4 is divided into hot-side conductor path parts 4a and 4b, and the ground-side conductor path 5 is divided into ground-side conductor path parts 5a and 5b. At the part of the chip varistor 22 in which the hot-side conductor path 4 and the ground-side conductor path 5 are divided, the chip varistor 22 is mounted on the substrate 3.

The four-terminal chip varistor 22 is described with reference to FIGS. 7 to 8B. The chip varistor 22 is constructed using a ceramic sintered body 23 having varistor characteristics. Internal electrodes 24 and 25, as shown in FIGS. 8A and 8B, are alternately laminated in the thickness direction via ceramic layers inside the ceramic sintered body 23 so as to maintain some distance therebetween. The internal electrodes 24 are substantially rectangular and have relatively thin electrode lead-out parts 24a and 24b. The electrode lead-out part 24a is extended to an end face 23a of the ceramic sintered body 23 at the side of a side face 23c thereof, and the electrode lead-out part 24b is extended to an end face 23b thereof at the side of a side face 23d thereof.

Likewise, the internal electrodes 25 have relatively thin electrode lead-out parts 25a and 25b. The electrode lead-out part 25a is extended to the end face 23a at the side of the side face 23d, and the electrode lead-out part 25b is extended to the end face 23b at the side of the side face 23c.

Figure 7:
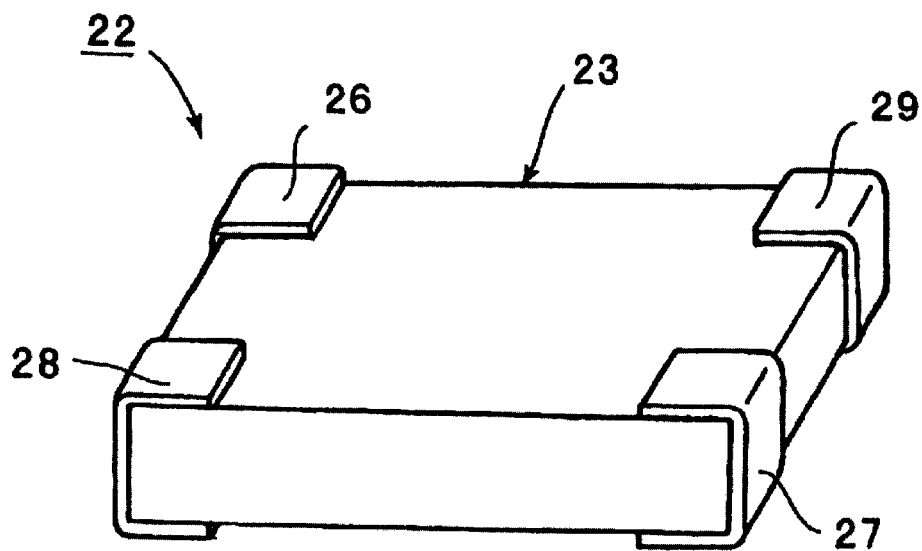
FIG. 7 is a perspective view of a four-terminal chip varistor used in the head shown in FIG. 6.
Figure 8A:
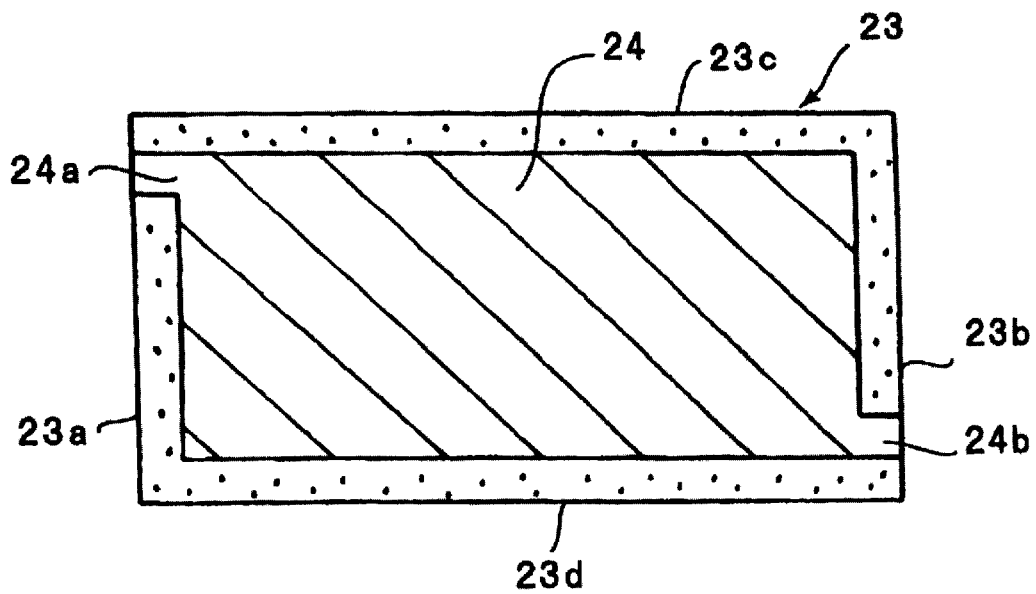
FIGS. 8A and 8B are illustrations each showing a plan cross sectional view of an internal electrode of the chip varistor shown in FIG. 7.
Figure 8B:
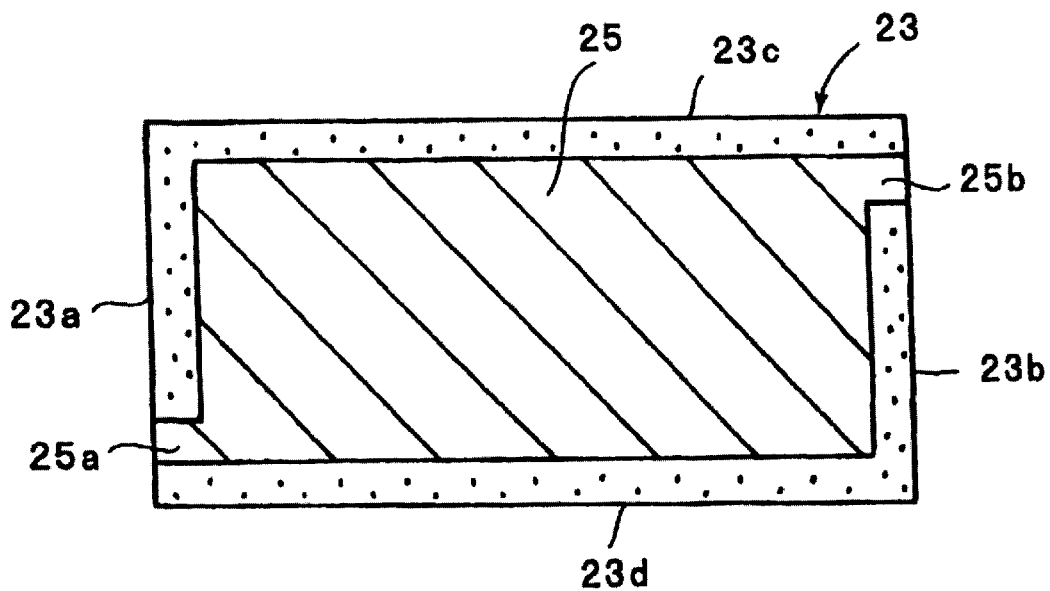
Figure 9:
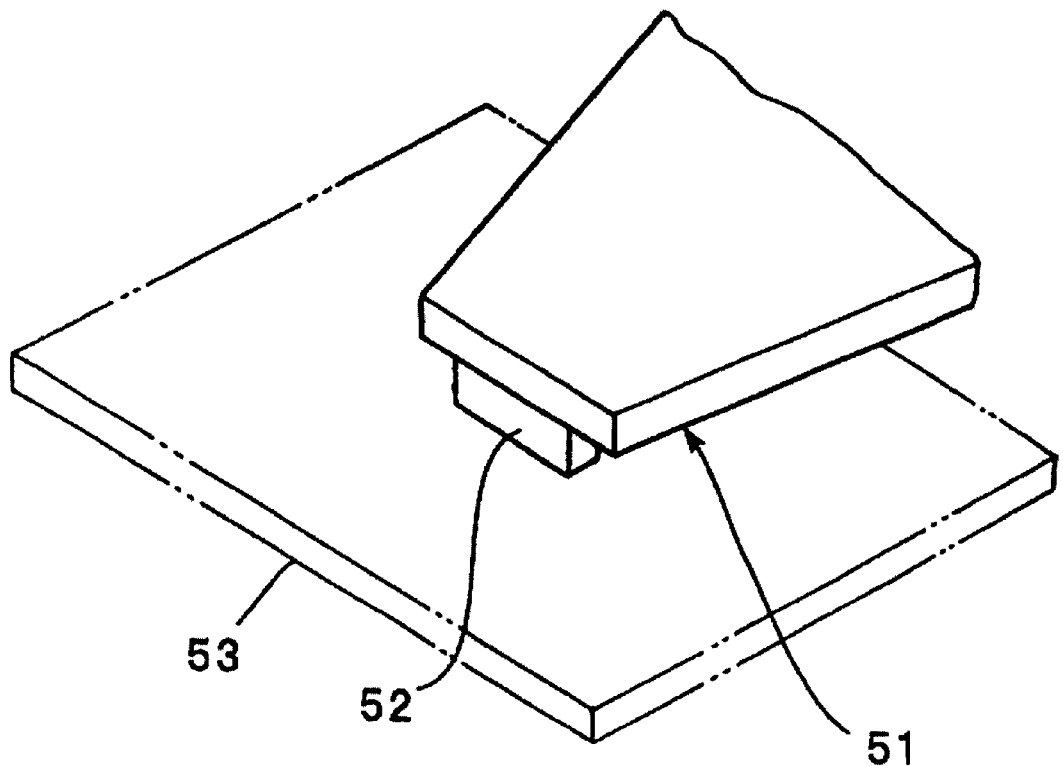
FIG. 9 is a perspective view of a conventional head.

As shown in FIG. 7, the first to the fourth terminal electrodes 26, 27, 28, and 29 are formed on the surface of the ceramic sintered body 23. The first and the second terminal electrodes 26 and 27 are electrically connected to the internal electrodes 24, and the third and the fourth terminal electrodes 28 and 29 are electrically connected to the internal electrodes 25.

The third and the fourth terminal electrodes 28 and 29 are connected to the ground potential.

As shown in FIG. 6, the first and the second terminal electrodes 26 and 27 are electrically connected to the hot-side conductor path parts 4a and 4b, respectively. The third and the fourth terminal electrodes 28 and 29 are electrically connected to the ground-side conductor path parts 5a and 5b, respectively.

In the second embodiment, since the above-described four-terminal chip varistor 22 is used, the inductance of the varistor is decreased by an amount corresponding to the equivalent-series inductance of the varistor in the same manner as in the first embodiment. Accordingly, the adverse influence of electrostatic noise can be securely eliminated.

In addition, even when electrostatic noise is input to the chip varistor 22 from the hot-side conductor path part 4b, electrostatic noise is discharged from the internal electrodes 24 to the internal electrodes 25, thus the electrostatic noise is output to the ground potential via the ground-side conductor path part 5b. This means that even though electrostatic noise is applied to the hot-side conductor path 4b, since the electrostatic noise is removed at the ground-side conductor path part 5b opposite to the ground-side conductor path part 5a where the chip varistor 22 is connected to the head chip 2, the influence of electrostatic noise on the head chip 2 can be positively removed.

What is claimed is:

1. A head comprising:

a head chip having first and second external connection electrodes for reading signals from a storage medium and writing signals on said storage medium;

a substrate having said head chip mounted thereon;

a hot-side conductor path and a ground-side conductor path each formed on the surface of said substrate and electrically connected to said first and second external connection electrodes of said head chip, respectively;

a chip varistor, mounted on said substrate, having first, second, and third terminal electrodes;

wherein said hot-side conductor path is divided, and the conductor path portions corresponding to ends of the divided hot-side conductor paths are electrically connected to the first and the second terminal electrodes of said chip varistor; and said ground-side conductor path is electrically connected to the third terminal electrode of said chip varistor.

2. A head according to claim 1, wherein said varistor further comprises a fourth terminal electrode, said ground-side conductor path is divided, and the corresponding conductor path portions of ends of the divided ground-side conductor paths are electrically connected to the third and the fourth terminal electrodes.

* * * * *